T. SPENCER.
CONSTANT VOLTAGE SYSTEM.
APPLICATION FILED JUNE 11, 1914.

1,220,371.

Patented Mar. 27, 1917.

WITNESSES:
D. Brewer
H. G. Grover

INVENTOR.
THOMAS SPENCER
BY Ira J. Adams,
ATTORNEY

UNITED STATES PATENT OFFICE.

THOMAS SPENCER, OF PHILADELPHIA, PENNSYLVANIA, ASSIGNOR TO HELIOS MANUFACTURING COMPANY, A CORPORATION OF PENNSYLVANIA.

CONSTANT-VOLTAGE SYSTEM.

1,220,371.  Specification of Letters Patent.  Patented Mar. 27, 1917.

Application filed June 11, 1914. Serial No. 844,550.

*To all whom it may concern:*

Be it known that I, THOMAS SPENCER, a citizen of the United States, residing at Philadelphia, in the county of Philadelphia and State of Pennsylvania, have invented a certain new and useful Improvement in Constant-Voltage Systems, of which the following is a full, clear, and exact description.

Generally speaking, my invention consists in employing opposing fields, one having values in accordance with Frölich's equation $$y = \frac{ax}{1+bx},$$

and the other being constant so that the resultant field is inversely proportional to the speed and a constant voltage is obtained with wide variations in speed of the prime mover. The most important application for such machines is in axle-driven train lighting systems, although the arrangement set forth may be applied advantageously to other constant voltage systems in which the speed of rotation of the prime mover is subject to variation. An ideal car lighting system should, without adjustment, give constant voltage at all speeds between wide limits, and it is the object of my invention to accomplish this result.

Figure 1:
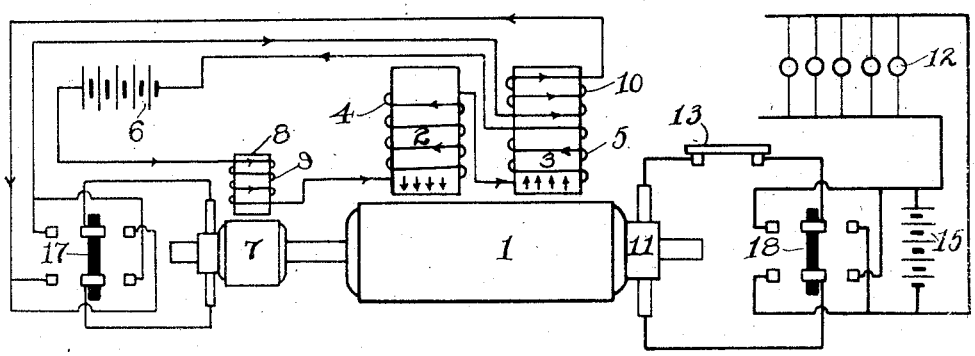
Figure 1 is a conventional illustration of a constant voltage system in accordance with my invention.

The main armature 1 of the generator is rotated in the adjacent fields 2 and 3 by some source of power, such as a car axle for instance. Current for the windings 4 and 5 respectively of these fields is supplied from a constant voltage system such as a storage battery 6. An exciter armature 7 is mounted on the same shaft as the main armature, or it may be mechanically connected thereto to rotate at a proportional speed. The field 8 of the exciter has a winding 9, also magnetized by current from the storage battery and in the drawing these windings are shown connected in series, but it will be evident to one skilled in the art that the same result could also be obtained by connecting the fields in parallel, by properly proportioning the field resistance or the voltage of the battery. Upon field magnet 3 is wound a second winding 10 which is connected with the terminals of the exciter 7. The direction of the magnetizing force of the winding 10 is opposite to that of winding 5, and a resultant field is obtained which varies with the speed of rotation of the prime mover. The commutator 11 of the main armature 1 may have its brushes directly connected with the terminals of the lighting or other load 12 through the usual automatic cut-out switch 13. Reversing switches 17 and 18 (Fig. 1) are inserted in the load circuit 12 and field circuit 10 respectively to reverse the direction of the current in these circuits when the direction of rotation of the prime mover is changed.

In practice, this switch may be combined with switch 13.

Figure 2:
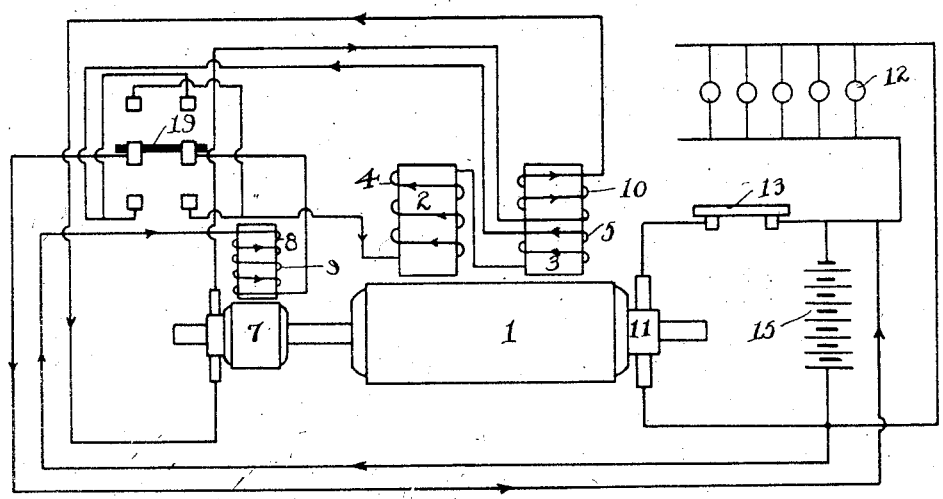
Fig. 2 is a modification.

Fig. 2 illustrates a modified wiring arrangement requiring only one battery 15, and a single reversing switch 19. One terminal of coil 9 is connected permanently to the central points of the reversing switch and the other terminal to the storage battery, so that the direction of this field is always the same. When the direction of rotation of the armature 7 is changed, the direction of the variable field 10 is therefore reversed and the reversing switch 19 simultaneously reverses the direction of the current in the field coils 4 and 5. The value of the resultant field is therefore preserved, but the polarity reversed whenever the direction of rotation is reversed. The current taken from the commutator 11 is thus always in the same direction.

The manner in which either arrangement fulfils the constant voltage requirement will be understood from the following explanation:

It has been shown by Frölich that within certain limits, a magnetization curve closely follows the law:

$$y = \frac{ax}{1+bx} \quad (1)$$

where $y$ is the flux, $x$ the M. M. F. producing this flux and $a$ and $b$ are constants. This equation can be transposed into the following form, which is more convenient for this proof:

$$y = \frac{a}{b} - \frac{\frac{a}{b^2}}{\frac{1}{b}+x} \quad (2)$$

Now, in the arrangement given by way of example above, two fields 2 and 3 are used;

and the constant field 2 is so designed that it has a value $$y' = \frac{a}{b} \quad (3)$$

$a$ and $b$ having the value of the constants in equation (2); and field 3 is made with two windings 10 and 5 having opposing M. M. F.'s $x'$ and $k$ respectively; $x'$ varying directly with the speed of the rotation of the armature shaft, and $k$ being a constant of a value of $\frac{1}{b}$ of equation (2). Then the M. M. F. in the equation (2) is equal to $$x' - \frac{1}{b}$$

and if this value is substituted for $x$ in equation (2), field 3 would have a value of, $$y = \frac{a}{b} - \frac{\frac{a}{b^2}}{\frac{1}{b} + \left(x' - \frac{1}{b}\right)} = \frac{a}{b} - \frac{\frac{a}{b^2}}{x'} \quad (4)$$

and since field 2 has a constant value of $$y' = \frac{a}{b}$$

of opposite polarity to that of field 3, then the resultant field acting on the armature would be the difference between the two differential fields 2 and 3 or, $$y'' = y' - y = \frac{a}{b} - \frac{a}{b} + \frac{\frac{a}{b^2}}{x'} \quad (5)$$

$$= \frac{\frac{a}{b^2}}{x'} \quad (6)$$

Bearing in mind that the variable magnetomotive force $x'$ is made proportional to the speed S, this expression reduces to $$y'' = \frac{\frac{a}{b^2}}{S} \quad (7)$$

or $$y'' = \frac{k'}{S} \quad (8)$$

The voltage developed in the generator of an armature follows the well known law E=KBS. Where K is a constant, B is the field strength and S the speed of rotation. Then $$E = \frac{k'}{S} KS$$

or $$E = K''$$

and by arranging a system in this way, a constant voltage may be therefore obtained at all speeds within which the magnetization curve closely resembles the curve $$y = \frac{ax}{1 + bx}$$

For ordinary purposes the conditions are such that the previous result is closely obtained for all speeds between 20 and 80 miles per hour. Below and above these limits, the battery carries the load.

It will also be noted that whenever the direction of rotation of the armatures 1 and 7 is changed, the reversing switch 17 is operated to keep the resultant field in the same direction.

Hysteresis can have no appreciable effect on the operation as a metal can be chosen which has negligible hysteretic properties. An instance of such is the cast steel usually used in field cores for train lighting generators especially.

Armature reaction can also be overcome in the same manner as in other systems by the use of appropriate interpoles or by other arrangements.

The figures are merely conventional showings of the way of carrying out the invention, and the invention is not to be limited thereto. It will be understood that in practice, fields 2 and 3 may each consist of one or more pairs of poles, the number being immaterial as far as the invention is concerned. Having described my invention, what I claim is:

1. The method of generating a constant voltage which consists in rotating armature conductors in a resultant field produced by opposing a constant field, of a value of $\frac{a}{b}$, by a second field produced by the difference between a variable M. M. F. $x$, proportional to the cutting speed of said conductors, and a second M. M. F. of the value $\frac{1}{b}$, said terms $a$, $b$, and $x$, having the relation given in Frölich's equation $$y = \frac{ax}{1 + bx}$$

2. In a constant voltage system, the combination with a rotatable main armature of a field pole having a coil, a second field pole having two coils, a source of constant E. M. F. connected to energize the coil on the first field pole and one coil on the second field pole, an auxiliary armature connected to rotate with said main armature, a field winding for said auxiliary armature connected to a source of E. M. F. to have an unchanging polarity, said auxiliary armature being connected to energize the other coil on said second field pole, and means for reversing the current in all of said coils whenever the direction of rotation of said main armature changes.

3. In a constant voltage system, the combination with a rotatable main armature of a field pole having a coil, a second field pole having two coils, an auxiliary armature connected to rotate with the main armature, a field winding for said auxiliary armature connected in series with one coil on each of said poles to a source of constant E. M. F.; said auxiliary armature being connected to energize the remaining field coil, and means for reversing the current in the field coils included in the series circuit without reversing the current in said field winding.

In testimony whereof, I hereunto affix my signature.

THOMAS SPENCER.

Witnesses:
REED H. KLANDE,
C. W. GULDEN.

---

It is hereby certified that in Letters Patent No. 1,220,371, granted March 27, 1917, upon the application of Thomas Spencer, of Philadelphia, Pennsylvania, for an improvement in "Constant-Voltage Systems," an error appears in the printed specification requiring correction as follows: Page 2, line 59, for the equation "$E=\frac{k'}{-}KS$" read $E=\frac{k'}{S}KS$; and that the said Letters Patent should be read with this correction therein that the same may conform to the record of the case in the Patent Office.

Signed and sealed this 1st day of May, A. D., 1917.

[SEAL.]

R. F. WHITEHEAD,
*Acting Commissioner of Patents.*

Cl. 171—225.